US012748536B2

(12) United States Patent
Benisty et al.

(10) Patent No.: US 12,748,536 B2
(45) Date of Patent: Sep. 29, 2026

(54) OPTIMIZED SELECTIVE SCANNING OF OVERLAP-TABLE IN STORAGE MEMORIES FOR SEQUENTIAL DATA

(71) Applicant: Sandisk Technologies, Inc., Milpitas, CA (US)

(72) Inventors: Shay Benisty, Beer Sheva (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 91 days.

(21) Appl. No.: 18/612,349

(22) Filed: Mar. 21, 2024

(65) Prior Publication Data

US 2025/0298522 A1 Sep. 25, 2025

(51) Int. Cl.
*G06F 3/06* (2006.01)
*G06F 12/0802* (2016.01)

(52) U.S. Cl.
CPC .......... *G06F 3/0625* (2013.01); *G06F 3/0659* (2013.01); *G06F 3/0679* (2013.01); *G06F 12/0802* (2013.01)

(58) Field of Classification Search
CPC ........ G06F 9/3836; G06F 9/38; G06F 9/3834; G06F 9/3838; G06F 9/4881; G06F 9/3856; G06F 13/1605; G06F 12/0868; G06F 12/0802; G06F 3/0659; G06F 3/0656; G06F 3/0625; G06F 3/0679
See application file for complete search history.

(56) References Cited

U.S. PATENT DOCUMENTS

| | | | | |
|---|---|---|---|---|
| 9,798,672 | B1 * | 10/2017 | Svendsen | G06F 12/0875 |
| 10,649,909 | B2 | 5/2020 | Lappi et al. | |
| 10,915,475 | B2 | 2/2021 | Dubey et al. | |
| 11,301,370 | B2 | 4/2022 | Pasquale et al. | |
| 11,513,959 | B2 | 11/2022 | Simionescu et al. | |
| 11,675,709 | B2 * | 6/2023 | D'Eliseo | G06F 12/1009 711/103 |
| 2018/0232310 | A1 * | 8/2018 | Chang | G06F 12/0864 |
| 2019/0235762 | A1 * | 8/2019 | Kaburaki | G06F 12/0864 |
| 2022/0129385 | A1 * | 4/2022 | Karve | G06F 12/0862 |
| 2022/0350744 | A1 * | 11/2022 | Urrinkala | G06F 12/0246 |
| 2024/0289915 | A1 * | 8/2024 | Durbhakula | G06F 12/0897 |

* cited by examiner

*Primary Examiner* — Curtis James Kortman
(74) *Attorney, Agent, or Firm* — Patterson + Sheridan, LLP

(57) ABSTRACT

A dual bitmap solution can be beneficial for reducing full cache scans due to data overlap issues that occur using an overlap mechanism. One bitmap is geared towards random read workloads while the other bitmap is geared towards sequential read workloads. When a read command is received, the appropriate bitmap is checked to see if a full scan is necessary. Only if a relevant bit of the bitmap indicates that there is an overlap will the full scan occur. The relevant bit corresponds to the data for a corresponding read command. The bitmaps can be maintained in parallel or the data storage device can switch between maintaining either a bitmap directed to sequential read workloads or a bitmap directed to random read workloads.

18 Claims, 9 Drawing Sheets

300

| DW | 31 24 | 23 16 | 15 8 | 7 0 |
|---|---|---|---|---|
| 0 | FLBA_L | | | |
| 1 | GRP_ID | | FLBA_M | |
| 2 | LENGTH | | | |

OPTIMIZED SELECTIVE SCANNING OF OVERLAP-TABLE IN STORAGE MEMORIES FOR SEQUENTIAL DATA

BACKGROUND OF THE DISCLOSURE

Field of the Disclosure

Embodiments of the present disclosure generally relate to reducing overlap table scanning.

Description of the Related Art

Nonvolatile memory (NVM) solid state drives (SSDs) today utilize an overlap mechanism. The overlap mechanism is used to detect any overlap between programming (i.e., executing write commands) and pending read commands. The detection is utilized to protect the atomicity and occasionally, the order of commands. In order to obtain the protection, the overlap table holding all the overlap information is large.

The very basic need for handling an overlap table is to keep atomicity. FIG. 2 demonstrates in diagram 200 the need to validate atomicity by applying such an overlapping mechanism. In FIG. 2, the host issues a read command from logical block address (LBA) 0 to 40, and a write command from LBA 0 to 40. In general, these commands are done in parallel, as the peripheral component interconnect express (PCIe) is a full duplex device. When the host has two pending commands for both read and write on overlapping ranges, the host expects to receive the data entirely before the write, or entirely after the write. However, if the data storage device is not aware of the range of the read command, or the read of the range of the write command, it is possible that the returned data for the read command will contain a mix of old data and new data. In this example, LBAs 0-20 and LBAs 30-40 of previous information could be returned, and data for LBAs 20-30 belonging to the new write command could be returned. Hence, a mix of the data could returned rather than the data from entirely before the write command or from entirely after the write command.

When the host issues a write command, the data storage device fetches the corresponding data associated with the write command. The data storage device then writes the data to the memory device (e.g., NAND) only after posting the completion entry to the host. The writing to the memory device (e.g., NAND), and specifically the programing stage, takes a lot of time, which in turn causes backpressure towards the host. To overcome the backpressure, multiple writes are accumulated, and the programing (e.g., writing) is done only when programming is optimal, after receiving data from multiple commands. However, to allow the data storage device to service more commands, maintain bandwidth, and provide better write quality of service (QoS), the write commands are marked as completed towards the host. These write commands are "cached" until such time when the data associated with the write commands can be programmed to the memory device (e.g., NAND).

Once a write command is completed, an overlapping read command is expected to return the last approved data. However, if the data storage device goes to the memory device (e.g., NAND) to fetch data, the data storage device will not provide the host with the correct data, since the data is not yet in the memory device (e.g., NAND) because the data is still "cached". As such, for every read command, the data storage device needs to make sure the command doesn't overlap with cached writes.

One regular process that happens in the SSDs is garbage collection. The data storage device, to ensure a host read command provides correct data, needs to track the areas that are being read and written back during the garbage collection process.

To improve performance, when the data storage device can predict what will be the next read command, it follows to fetch that data from the memory device (e.g., NAND) prior to receiving the read command (i.e., early fetch). To gain from the early fetches, the data storage device needs to track which LBA ranges have been fetched, so that if a read (or write) command arrives to read (or write) the tracked LBA range, the data storage device will detect that the LBA range has already been fetched, and will skip re-fetching (or drop previous fetch in case of an overlapping write).

The reasons mentioned above, as well as others, dictate the holding of an overlap table. Since many commands are supported in parallel (i.e., many outstanding cached write ranges, etc.), the overlap table is quite large. FIG. 3 depicts an example 300 of the size of a single entry in an overlap table. In FIG. 3, {FLBA_M, FLBA_L} is the start an LBA of the command, and LENGTH is the size of the command. Together the start of the LBA command and the length comprise the total range of the entry. GRP_ID is used by the hardware (HW) and firmware (FW) to manage a number of ranges belonging to the same group. The overlap table is expected to keep growing as PCIe speed advances.

For high queue depths, random read performance dictates that a new command arrives frequently, and care needs to be taken to compensate for any bubbles in the flow of arriving command. It should be noted that when working with low queue depth, the latency becomes an important metric to meet. As SSDs advance, performance advances, which leads to overlap table size increases.

For every command that arrives, usually from the host but sometimes due to internal use like garbage collection, the entire pending program commands database needs to be scanned for overlaps. As the database is already quite long, and growing, high queue depth can't be endured when bandwidth is critical.

Therefore, there is a need in the art for an improved overlap mechanism.

SUMMARY OF THE DISCLOSURE

A dual bitmap solution can be beneficial for reducing full cache scans due to data overlap issues that occur using an overlap mechanism. One bitmap is geared towards random read workloads while the other bitmap is geared towards sequential read workloads. When a read command is received, the appropriate bitmap is checked to see if a full scan is necessary. Only if a relevant bit of the bitmap indicates that there is an overlap will the full scan occur. The relevant bit corresponds to the data for a corresponding read command. The bitmaps can be maintained in parallel or the data storage device can switch between maintaining either a bitmap directed to sequential read workloads or a bitmap directed to random read workloads.

In one embodiment, a data storage device comprises: a memory device; and a controller coupled to the memory device, wherein the controller is configured to: receive a read command; detect whether the read command is a sequential read command or a random read command; search a cache occupation bitmap; and determine whether a full cache scan is necessary.

In another embodiment, a data storage device comprises: a memory device; and a controller coupled to the memory device, wherein the controller is configured to: determine that a full cache scan is necessary for a first read command; determine that a full cache scan is not necessary for a second read command; determine that a full cache scan is necessary for a third read command, wherein the first read command, the second read command, and the third read command are received in order; and perform a full cache scan for the first read command and the third read command, wherein the full cache scan for the first read command occurs after determining that the full cache scan is not necessary for the second read command.

In another embodiment, a data storage device comprises: means to store data; and a controller coupled to the means to store data, wherein the controller is configured to: maintain a first cache occupation bitmap; maintain a second cache occupation bitmap; receive a read command; detect a collision for the read command in one or more of the first cache occupation bitmap and the second cache occupation bitmap; perform a full cache scan; and deliver data associated with the read command to a host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A dual bitmap solution can be beneficial for reducing full cache scans due to data overlap issues that occur using an overlap mechanism. One bitmap is geared towards random read workloads while the other bitmap is geared towards sequential read workloads. When a read command is received, the appropriate bitmap is checked to see if a full scan is necessary. Only if a relevant bit of the bitmap indicates that there is an overlap will the full scan occur. The relevant bit corresponds to the data for a corresponding read command. The bitmaps can be maintained in parallel or the data storage device can switch between maintaining either a bitmap directed to sequential read workloads or a bitmap directed to random read workloads.

Figure 1:
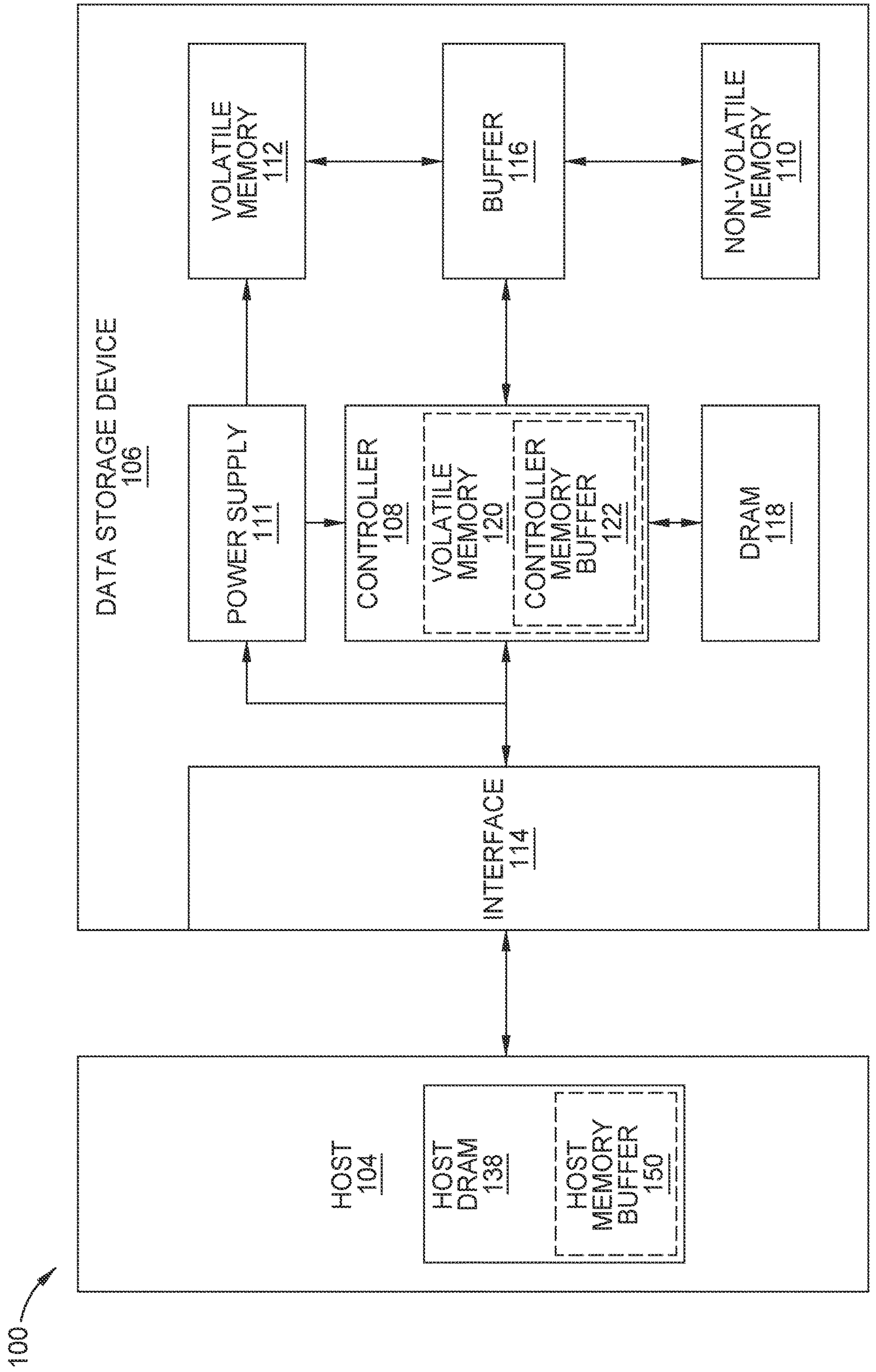
FIG. 1 is a schematic block diagram illustrating a storage system in which a data storage device may function as a storage device for a host device, according to certain embodiments.
Figures 2, 3:
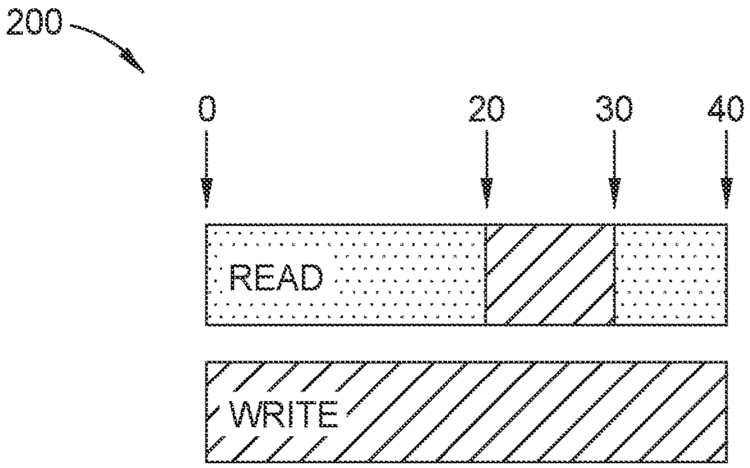
FIG. 2 is a schematic illustration of an overlap problem.
FIG. 3 is a schematic illustration of a single entry of an overlap table according to one embodiment.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 4:
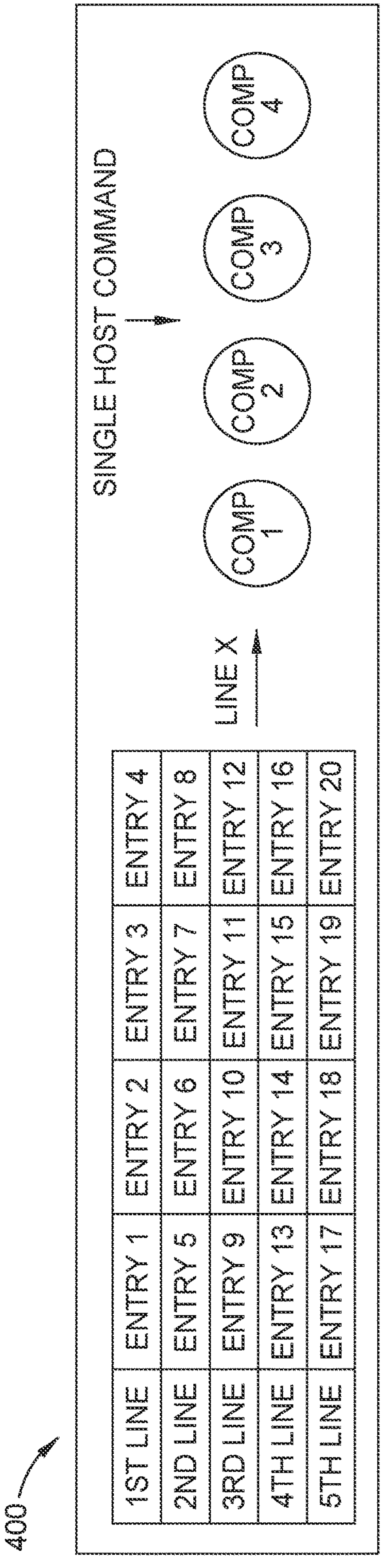
FIG. 4 is a schematic illustration of storing multiple entries in a single line of an overlap table.
Figure 5:
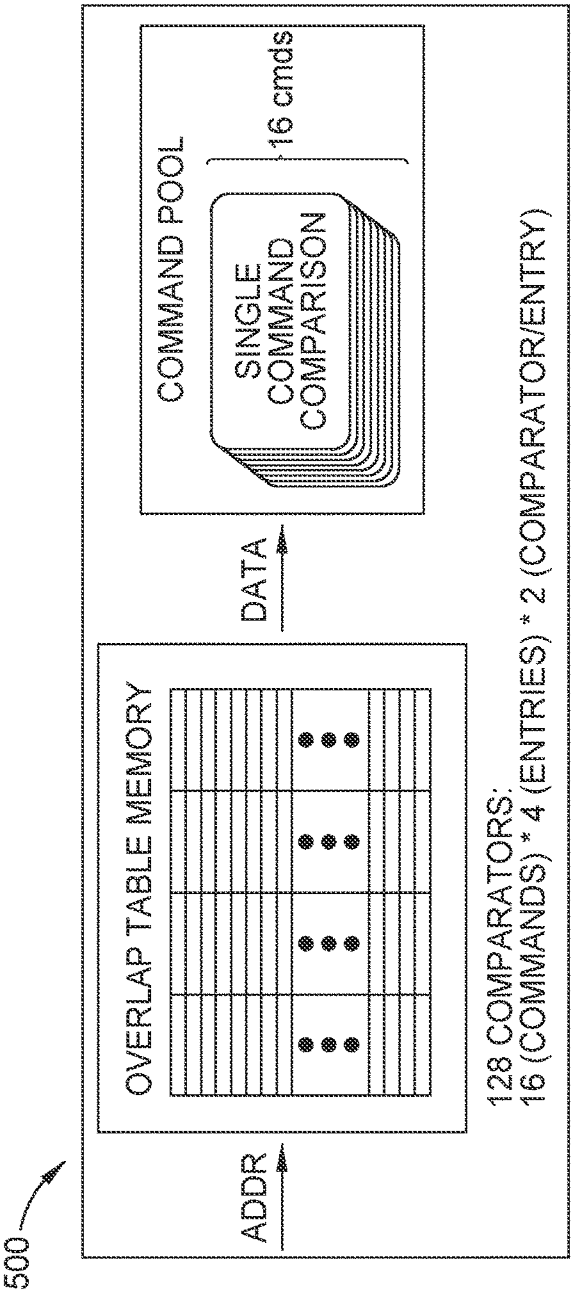
FIG. 5 is a schematic illustration of a parallel command comparison.

To deal with the overlap table scanning issue, there are multiple approaches possible. It is noted that the overlap table is disposed within the controller. One such method is to increase the memory width to four ranges (for example), referred to as "Entries" at one line, thus decreasing the number of lines. FIG. 4 is a schematic illustration 400 of storing multiple entries in a single line of an overlap table. While increasing the width decreases the number of lines, there is only so long that such a solution will be viable. With a continual increase in size, the width or number of lines or a combination of both will lead to an ever expanding overlap table that will need to be searched. Another possibility is to increase the frequency, however even for 7 nm processes, it will become impossible to generate logic at much faster rates than 1 GHz. Yet another possibility is introducing smart search algorithms, but using smart search algorithms is a very complex solution. Another possibility is to parallelize the number of commands on which the search is performed based upon the queue depth. FIG. 5 is a schematic illustration 500 of a parallel command comparison. However, such a parallelism solution has a price of HW complexity and power consumption, which are traded-off versus the search execution latency. Parallelized commands still suffers from being a full-scale exhaustive search nature, at which each entry of the pending program commands cache should be scanned and compared to each new read command. Although parallelized commands allows a tradeoff between the search latency and HW complexity and power consumption, such a full-scale search approach is an expensive and performance limiting factor as technology scales. It would be desired to enable a simple solution that will allow to scan only a limited range of the pending program commands cache.

In contrary to all previous approaches to solve the problem that were based on execution of full-scale search of all the pending-program-commands cache (i.e., overlap table) for each new read command, as discussed herein, a selective scanning is proposed which will omit the full-search for most read commands.

In order to reduce the frequency of execution of full searches on the pending-program-commands cache (i.e., overlap-table-memory), bitmap RAM is allocated at which each bit represent a predefined memory address range noted herein as resolution or "RES" (e.g. "RES"=1 MB). In that manner, for 1 GB storage address range, there is an allocate bitmap of size of 1000 bits. The bitmap is initialized with zeros, indicating an empty pending-program-commands-cache, and is updated with 1's in the relevant sections for any write/program command that enters the cache. Once write/program command is executed, the relevant bits at the bitmap are reset to zero.

For every read command that enters, either originated from the host or internally during garbage collection for example, the relevant bits at the bitmap are calculated for current the read command (see FIG. 6) and checked to see whether any of the bits at the bitmap are marked as 1 which indicates that the current read command has an overlap with one or more of the commands placed at the pending-program-commands-cache.

Figure 6:
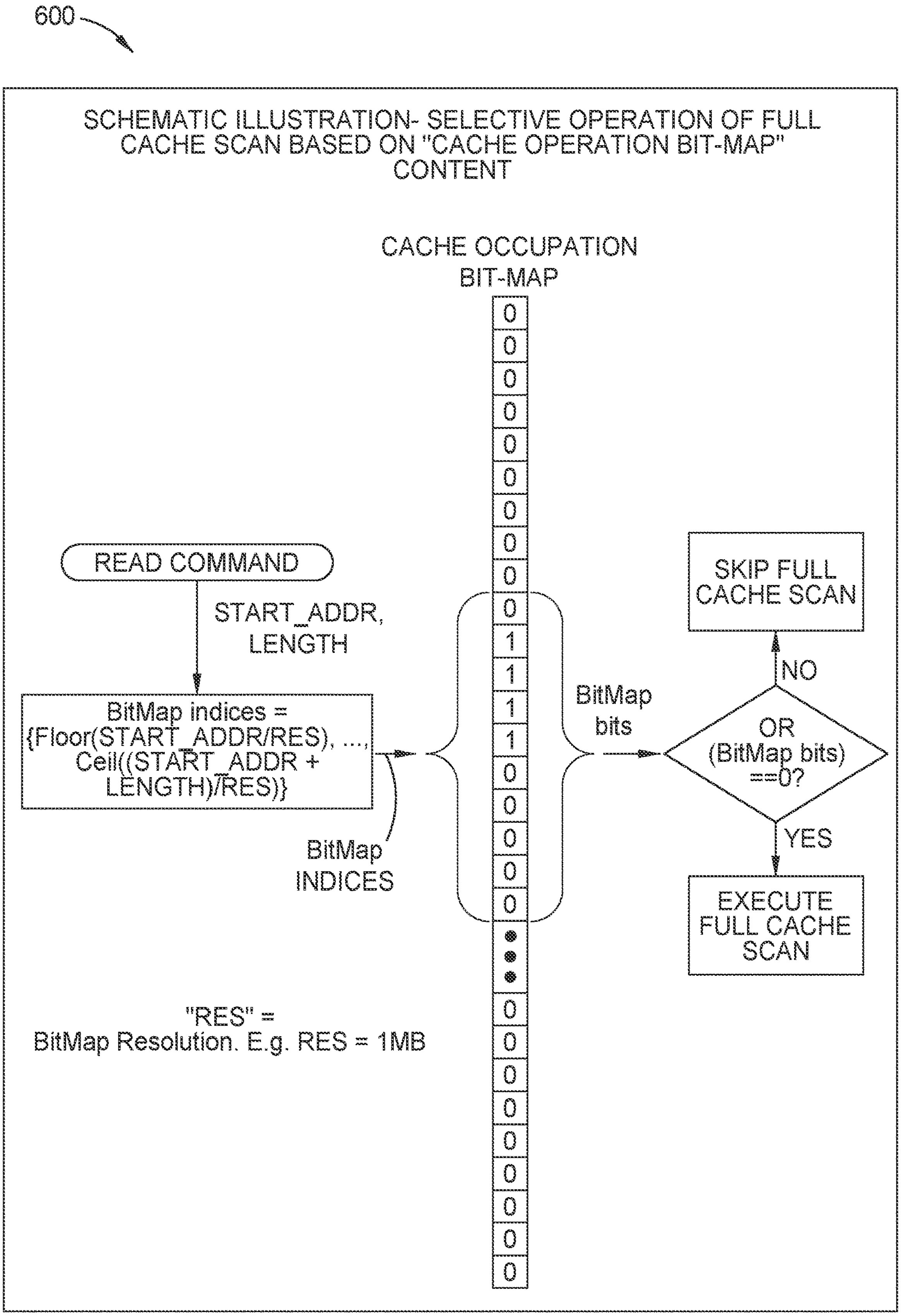
FIG. 6 is a schematic illustration of selective operation of a full cache scan based on cache operation bitmap content according to one embodiment.

In regards to FIG. 6, a brief discussion of using a cache occupation bitmap will now be provided. Even with the cache occupation bitmap, there will still be an overlap table, but the number of searches of the overlap table will be reduced by having a bitmap. Each bit within the bitmap represents some amount of memory. Consider an example of 1 bit of the bitmap representing 1 MB of the overlap table. If there is something in the overlap table associated with this specific 1 MB of memory, the corresponding bitmap bit will be set to 1, otherwise the corresponding bitmap bit is cleared to zero. Whenever a read command is received, then the first thing checked, prior to the overlap table, is the bitmap.

Take an example of a 4K read command. The first step is to figure out which bitmap bit corresponds to the 4K read command data. It is important to note that a read command may span multiple bitmap bits. Once the relevant bitmap bit(s) is(are) detected, the value of the bitmap bit is checked. If the value of the relevant bitmap bit is 1, then there is something in the cache in the corresponding 1 MB of memory. In that scenario, the next phase is to implement the scanning on the overlap table and do the full search operation. However, if the relevant bitmap bit is 0, there is nothing in the cache associated with the 1 MB, and the read command can be executed by obtaining the data from the memory device (e.g., NAND).

It is to be noted that within the 1 MB represented by the bitmap bit may in fact be more data than associated with the read command. For example, within the 1 MB, the read command may involve only 4 KB. For a bitmap bit value of 1, it is possible that the overlap table data in cache that results in the bitmap bit value of 1 is not for the 4 KB, but rather, for some other portion of the 1 MB. Thus, simply because the relevant bitmap bit has a value of 1 does not mean that there is cache data for the read command. Of course, it is not known what the bitmap bit value of 1 is due to when simply checking the bitmap. Therefore, whenever the bitmap bit value is 1, the full search will occur. It will only be after the search occurs that it will be known whether the bitmap bit value of 1 was due to data associated with the read command or some other data. It is to be understood that a resolution value of 1 MB is merely for example purposes. Different resolution values are contemplated. Furthermore, while the resolution is equal for all bitmap bits in the discussed example, it is contemplated that one or more bitmap bits may have a different resolution.

More specifically in regards to FIG. 6, a read command is initially received. Based on the start address and the length of the read command, the relevant bit of the bitmap is calculated. As noted above, there may be multiple relevant bits of the bitmap for the read command. Once the relevant bitmap bit is determined, the value of the relevant bit is checked in the cache occupation bitmap. If the relevant bit in the bitmap is 0, then there is nothing in the cache associated with the read command and the full cache scan can be skipped. If the relevant bit in the bitmap is 1, then it means that there is a hit, not necessarily for the specific read command, but in this zone there is a hit and in that scenario a full cache search operation needs to be executed. So while there is a full search of the overlap table when there is a value of 1, it is the values of 0 where the benefit is realized because prior to the disclosure, even the bitmap bits that have a value of 0 would have received a full search. In the instant disclosure, because there are bitmap bits, some full searches that would otherwise have occurred, will not occur. Thus, the number of searches is reduced significantly on average.

In most cases there will be no overlaps such that the need to scan the cache is reduced and instead the data can be directly read from the memory device (e.g., NAND). A schematic illustration of the proposed concept vs. the concept of all previous approaches is illustrated in flowcharts 700 and 800 of FIGS. 7 and 8 respectively.

Figure 7:
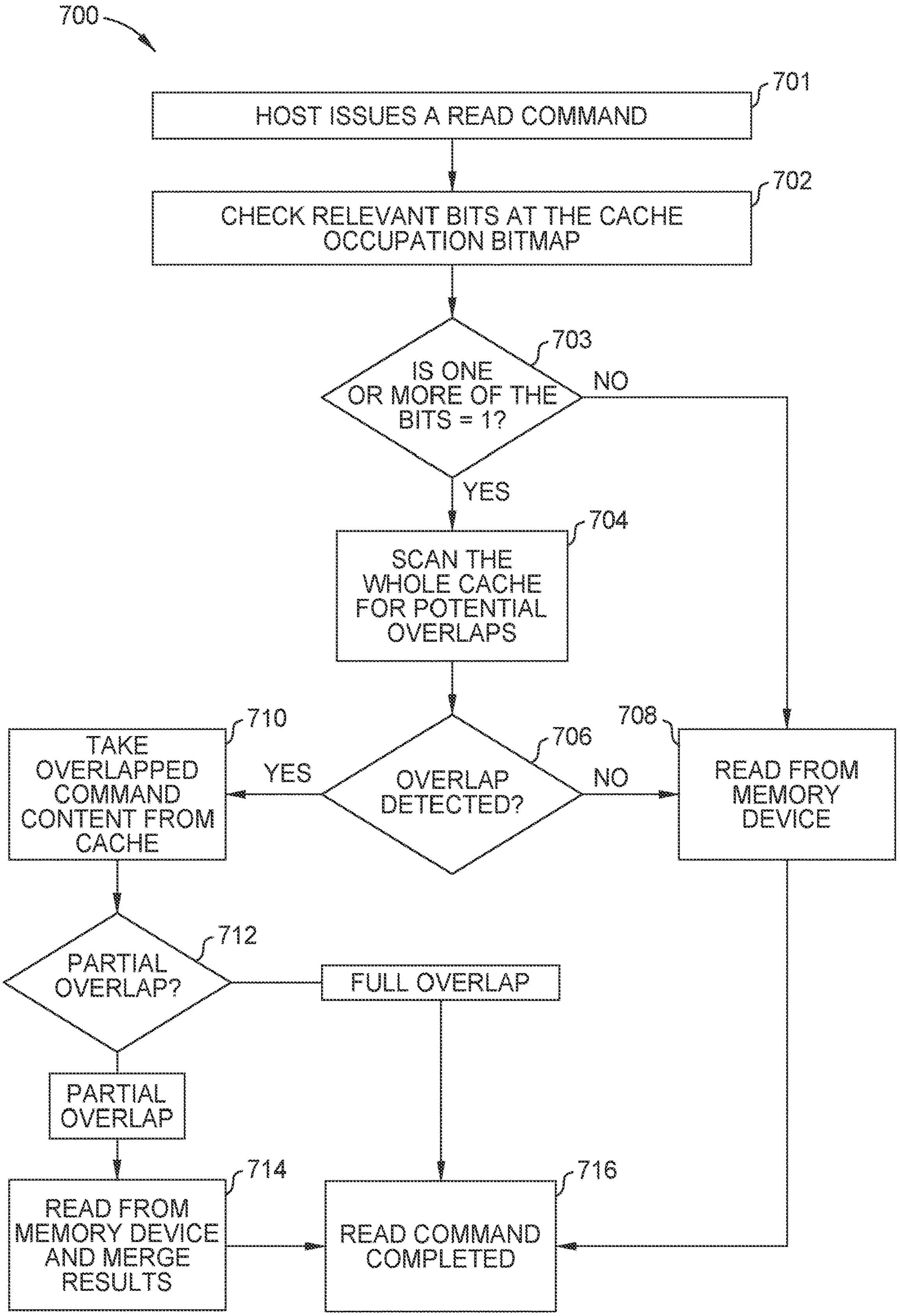
FIG. 7 is a flowchart incorporating the use of a cache occupation bitmap.

In FIG. 7, the host issues a read command and the data storage device has to perform a full scan operation over the overlap table. If overlap is not detected, the data can be read from the memory device. If overlap is detected, then the overlap data from the cache needs to be taken rather than the data from the memory device. If there is a full overlap, everything is from the cache and nothing is from the memory device. If there is a partial overlap, it means that part of the data is stored in the cache and part of the data is stored in the memory device. For a partial overlap, a mixture occurs so that part of the data will be fetched from the memory device part from the cache. Finally, the read command completed. The steps involve first checking the relevant bits at the cache occupation bitmap and then checking whether the value is 1 or 0. If the value is 1, the full search occurs. Otherwise, the read command can be executed by reading the data from the memory device (e.g., NAND), because the data is not stored in the cache.

More specifically in regards to FIG. 7, the flowchart 700 illustrates first receiving a read command from a host device at block 701. After the host issues a read command at block 701, the relevant bits of the cache occupation bitmap are checked at block 702 and then a determination is made regarding whether one or more of the relevant bits has a value equal to 1 at block 703. If there are no relevant bits with a value of 1 at block 703, then the data is read from the memory device at block 708. However, if one or more bits do have a value of 1 at block 703, then the whole cache is scanned for potential overlaps at block 704. If there is no overlap detected at block 706, then the data is read from the memory device (e.g., NAND) at block 708 and the read command is completed at block 716. However, if there is an overlap detected at block 706, then the overlapped command content is retrieved from cache in block 710. A determination is then made at block 712 regarding whether there is partial overlap or a full overlap. For a full overlap, the read command can be completed at block 716 because all of the data has already been retrieved from cache. For a partial overlap, the data read from the memory device and merged with the data from the cache at block 714 and then the read command is completed at block 716.

A multi-mode method that would maneuver between two different cache-bitmap versions according to current workload is discussed herein. Specifically, a dual-bitmap solution is proposed where one cache-bitmap supports sequential read workloads and the other cache-bitmap is adapted to support random read workloads. Whichever bitmap is the better bitmap to work with according to current workload type will be chosen.

The cache occupation bitmap from FIGS. 6 and 7 above suites random read workloads. What will be discussed below is another bitmap arrangement for sequential read workloads that will spread the occasions of these cache scans more equally along the timeline and will prevent cache scan clusters which are a side effect of FIGS. 6 and 7 when performing sequential reads. Both bitmap arrangements reduce the frequency of executing a full cache scan procedure compared to previous approaches discussed above.

There are two main options discussed below to allow spreading along time of such cache scan clusters for sequential read workloads: randomized bitmap and reordering of read command execution. A randomized bitmap is where each bit at the cache occupation bitmap will represent a collection of 1 MB non-consequent addresses along storage address range. Reordering of read command execution is consequent read commands that require scan of pending-program-commands-cache will be delayed as to break sequences of cache scans.

More specifically in regards to the randomized bitmap option, in order to avoid executing consequent cache scan scenarios in case of sequential read commands, the cache occupation bitmap content is allocated to represent spread address ranges along the storage address space. A comparison of the traditional sequential allocation of the bitmap vs. an example spread allocation appears is FIGS. 8A and 8B.

In that manner, a sequential read command (e.g., read storage address range of 0-1 MB) which is split to 256 consequent read commands of 4 KB each (0-4 KB, 4 KB-8 KB, etc.) are indicated by different bits at the cache bitmap, and overlap is avoided/minimized. That way, given that a single LBA from the address range of 0-1 MB appears in the range, the single LBA will not dictate executing the cache scan for all 256 read commands. It should be noted that the internal arrangement illustrated above at FIGS. 8A and 8B is only an example.

Figure 8A:
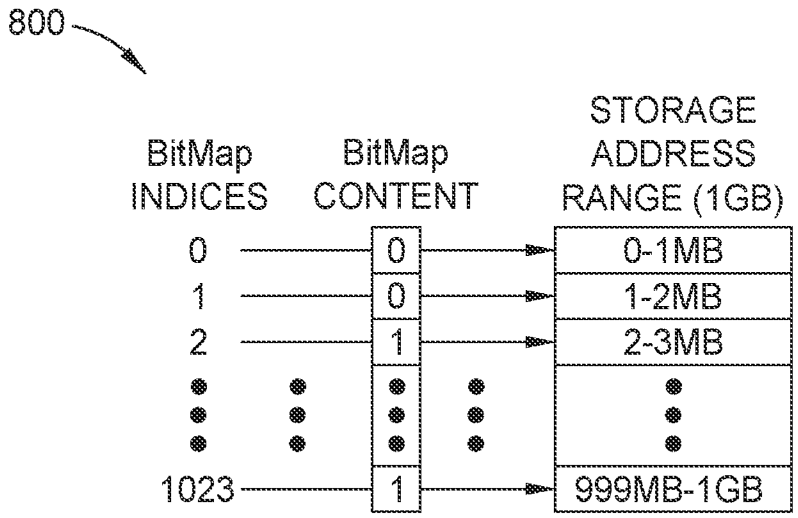
FIG. 8A is a schematic illustration of a cache occupation bitmap optimized for random read workloads.
Figure 8B:
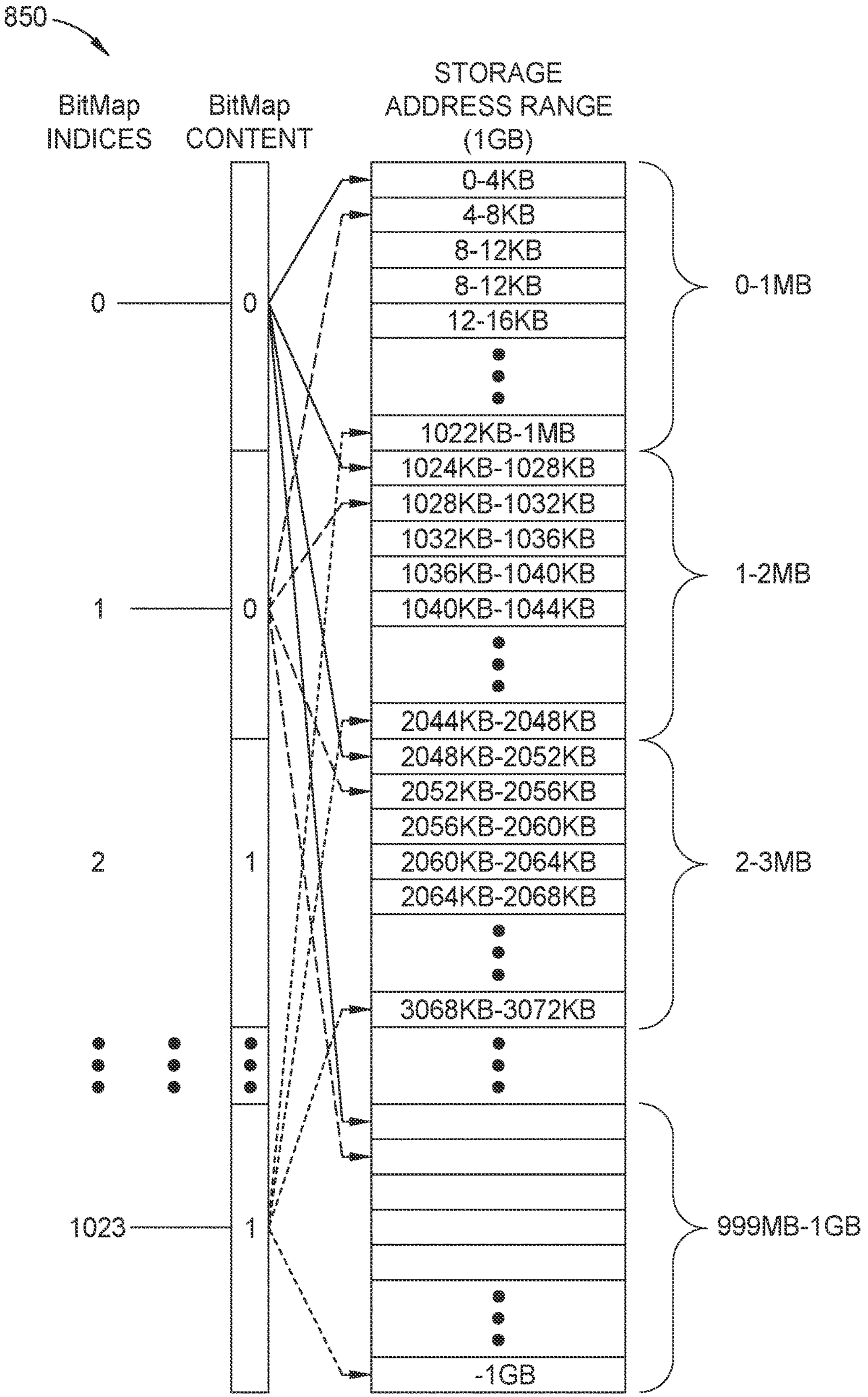
FIG. 8B is a schematic illustration of a cache occupation bitmap optimized for sequential read workloads.

In regards to FIGS. 8A and 8B, there is a bitmap with each bit representing 1 MB, for example, of memory and this is consequent. Each bit will still represent 1 MB of memory, but each bit will take 4K from the first piece, another 4K from the second piece, and so on. Thus, multiples of 4K of memories in total wherein 1 MB will be represented by one bit. If the one bit is set to one, it means that there is something in the cache associated with the entry. Instead of describing in one bit and another bit, the 1 MB of memory is split into multiple small chunks of memories. The address of each command is the consequent to the previous command and the size of each command is 4K. The first command will set the first bit in the bitmap, then the next command will set the second bit in the in the bitmap. Note that the first ones will not access the first bit, but rather, the second 4K will access the first bit in the first MB of memory. The bit in the bitmap that is responsible for that is bit number one and not bit number zero. By doing this algorithm or this mapping, the benefit for sequential workloads is realized.

In regards to FIG. 8A and FIG. 8B, the multi flavor cache occupation bitmap arrangement is show for random and sequential workloads. FIG. 8A shows the cache occupation bitmap optimized for random read workloads while FIG. 8B shows the cache occupation bitmap optimized for sequential workloads. As shown in FIG. 8A, there are bitmap indices that lead to bitmap content and a storage address range, which is another visual representation of the embodiment shown in FIG. 6. As shown in FIG. 8B, there is also bitmap indices, bitmap content, and a storage address range, but the bitmap content is not directly aligned with the storage address range. Rather, the bitmap content goes to different locations within the storage address range to be able to handle sequential reads as the data to be read is randomly scattered throughout the storage address range but needs to be sequentially read. Hence, the bitmap in FIG. 8B is able to handle sequential reads because the bitmap content is arranged to sequentially order the randomly arranged storage address range.

Regarding the reordering of read commands execution, the prevention of clusters of full-scan of cache is handled during the execution time of the read commands rather than during the bitmap allocation. Read commands which require cache scan will be delayed once a cluster of such commands is detected. Such reordering of the read commands will allow avoiding overload peak points, and allow equalizing the scan caused performance burden. The thresholds and conditions for delaying of such cache scan related sequential read commands could be handled by pre-defined thresholds, optionally concluding indication from the system about current power consumption, system overload state, performance and QoS requirements.

Basically, detect that there is a sequential workload, and delay the execution of those write commands. The delay will be for some period of time so that more commands associated with the same 1 MB of memory will accumulate and then be executed together. In so doing, the bitmap will be accessed only one time to access a bit to be able to execute multiple commands instead of executing those commands one by one and having a full search operation.

Figure 9:
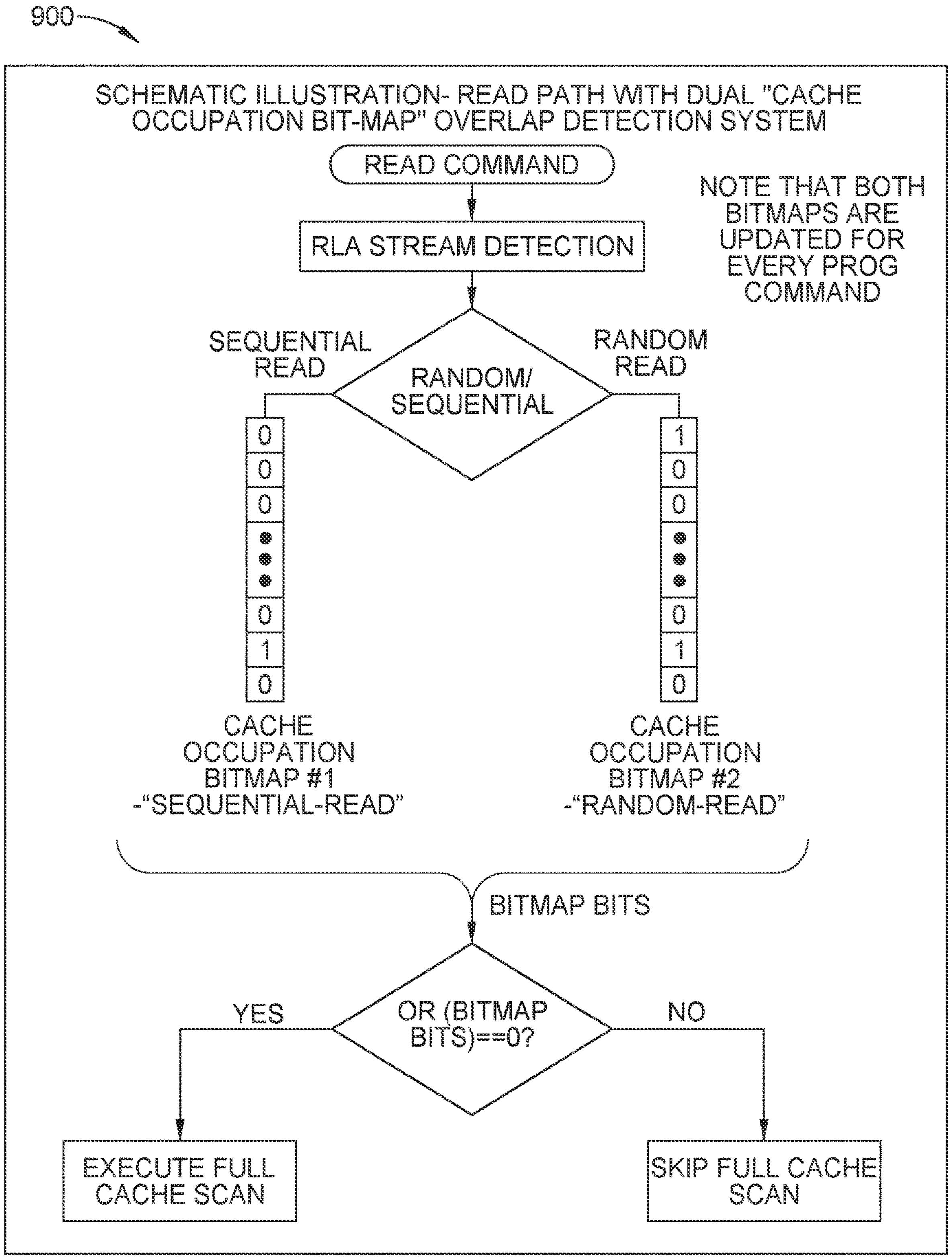
FIG. 9 is a schematic illustration of a read path in which dual cache occupation bitmaps are maintained.

Another option is a combined solution where there are several bitmap tables (e.g., two such tables) where one bitmap arrangement supports sequential read workloads, and the other cache bitmap is adapted to support random read workloads. The better bitmap will be chosen to work with according to current workload type according to indication of the workload nature. The identification of current workload type could be provided by simple logic that detects the current workload based on statistic collection. During execution of read commands, the overlap cache scan will be based on using only one chosen bitmap. However, it should be noted that during every program command, both bitmaps will be updated. A schematic illustration of the read path with dual cache occupation bitmap appears in FIG. 9. In FIG. 9, there is still a sequential a bitmap vector and also a random a bitmap vector from the first approach. Both bitmap are maintained together, and there are several manners to use the dual bitmap approach.

In one embodiment, two bitmaps are maintained and are used both in write and read commands. Only when detecting collision in both bitmaps, the command would "pass" the collision candidate criteria. In yet another embodiment, two bitmaps are maintained in-parallel and updated whenever executing a write command. However, on read command, only one bitmap is checked based on the current workload. In the last embodiment, only one bitmap is maintained while the algorithm used for generating it depends on the current workload. In random workload, it works in one method while in a different method for sequential workload. The switches between the modes requires quiescing and flushing the cache which map influence the performance.

TABLE

| | $1^{st}$ bitmap | $2^{nd}$ bitmap | Pros | Cons |
|---|---|---|---|---|
| $1^{st}$ Embodiment | Sequential Optimization; used in both read and write commands | Random optimization; used in both read and write commands | False collision probability is reduced | Area (2 bitmaps), latency and power |
| $2^{nd}$ Embodiment | Sequential optimization; used in write commands and partially in read commands | Random optimization; used in write commands and partially in read commands | False collision probability is reduced | Area (2 bitmaps) and power |
| $3^{rd}$ Embodiment | Selected algorithm depends on the current workload | N/A | Area (1 bitmap), latency and power | Complex flows for switching between workloads |

In the $1^{st}$ Embodiment of the Table, there are two bitmaps. Both bitmaps are maintained and used together in writing. In the write command, whenever receiving the write command, the relevant bits are marked in both bitmap vectors. Whenever receiving a read command, both a bitmap vectors are checked and several bits are compared from the two bitmaps. Only when there is a collision in both a bitmap vectors will the full search be implemented. If there is a collision only in one bitmap vector and in another bitmap vector there isn't have a collision, it means that the read command can be executed because there is not a real collision.

In the $2^{nd}$ Embodiment of the Table, there are still two bitmaps that are updated when receiving a write command. However, for read commands, only one bitmap vector is checked based upon the workload. Whether the workload is a random workload or a sequential load workload is determined. Thus, only one bit determines whether there is a collision that necessitated the full search operation.

For the $3^{rd}$ Embodiment, a mixture of dynamically switching between the two bitmaps is considered. For each command, a decision is made whether to look at the first vector or on the second vector. The decision could be based on the current workload that in the system or on other parameters, but actually there is the freedom to look on both vectors, a combination of the vectors, part of the vectors, and so on.

Figure 10:
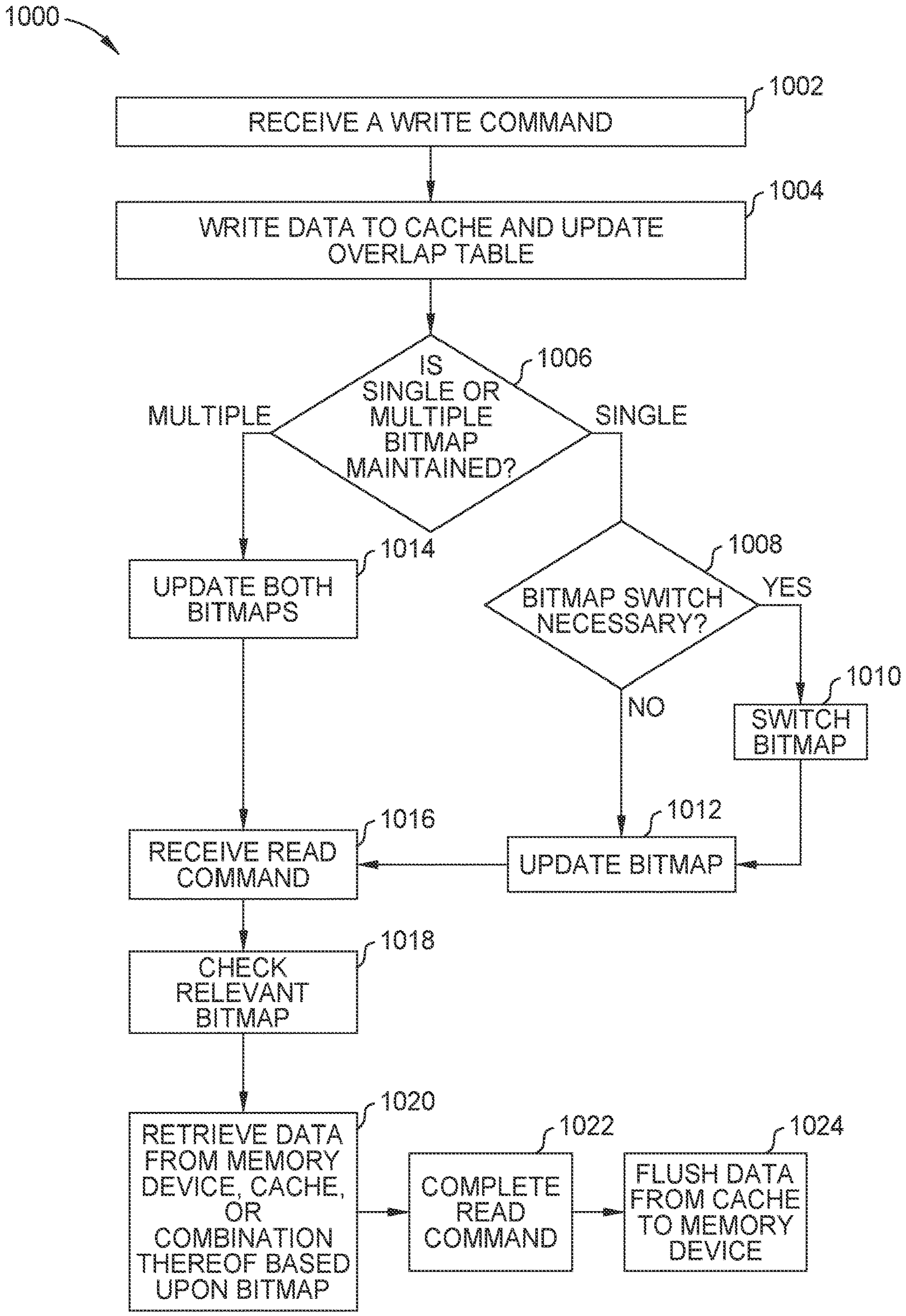
FIG. 10 is a flowchart illustrating a method of maintaining and using bitmaps.

FIG. 10 is a flowchart 1000 illustrating a method of maintaining and using bitmaps. A write command is received at block 1002 followed by writing data to cache and updating an overlap table at block 1004. A determination is made at block 1006 regarding whether a single bitmap or multiple bitmaps are maintained. If a single bitmap is maintained, then a determination is made at block 1008 regarding whether a switch between bitmaps is necessary. A switch may be necessary if the currently maintained bitmap is sequential but the needed bitmap is random (or vice versa). If a switch is necessary, then the switch is made at block 1010 followed by updating the bitmap at block 1012. If a switch is not necessary, then the process proceeds straight to updating the bitmap at block 1012 from block 1008. If multiple bitmaps are maintained at block 1006, then both bitmaps are updated in block 1014. After updating bitmaps at blocks 1012 or 1014, a read command is received at block 1016 followed by checking the relevant bitmap at block 1018. The data is then retrieved from either the memory device, the cache, or a combination thereof at block 1020 based upon the relevant bit(s) of the bitmap. Thereafter, the read command is completed at block 1022, and the data is eventually flushed from the cache to the memory device at block 1024.

The disclosure has dramatic advantages, especially in performance and power consumption, in cases of sequential read commands. Reducing the number of searches/full-scans of the pending-program-commands-cache in such workloads will save power, improve performance, and reduce system overhead.

In one embodiment, a data storage device comprises: a memory device; and a controller coupled to the memory device, wherein the controller is configured to: receive a read command; detect whether the read command is a sequential read command or a random read command; search a cache occupation bitmap; and determine whether a full cache scan is necessary. The controller is configured to maintain a first cache occupation bitmap for sequential read commands and a second cache occupation bitmap for random read commands. The cache occupation bitmap comprises a plurality of bitmap bits, wherein each bit of the bitmap bits corresponds to a predetermined amount of a storage address range. The predetermined amount is substantially equal for each bitmap bit. The predetermined amount comprises a plurality of address ranges that are logical sequential. The plurality of logically sequential address ranges are randomly distributed within the storage address range. Determining whether a full cache scan is necessary comprises determining whether one or more bits of the cache occupation bitmap has a value of 1, wherein the one or more bits correspond to the read command. Upon determining that one or more bits of the cache occupation bitmap has a value of 1, a full cache scan is performed to search for overlaps. Data for the read command is read from the memory device after performing the full cache scan. The controller is configured to maintain a single cache occupation bitmap that is either a sequential read workload based cache occupation bitmap or a random read workload based cache occupation bitmap, wherein the controller is configured to switch between maintaining the sequential read workload based cache occupation bitmap and the random read workload based cache occupation bitmap based on detecting either a random read workload or a sequential read workload, wherein the controller is configured to quiesce and flush the single cache occupation bitmap when switching between cache occupation bitmaps.

In another embodiment, a data storage device comprises: a memory device; and a controller coupled to the memory device, wherein the controller is configured to: determine that a full cache scan is necessary for a first read command; determine that a full cache scan is not necessary for a second read command; determine that a full cache scan is necessary for a third read command, wherein the first read command, the second read command, and the third read command are received in order; and perform a full cache scan for the first read command and the third read command, wherein the full cache scan for the first read command occurs after determining that the full cache scan is not necessary for the second read command. Determining that a full cache scan is necessary for the first read command comprises checking a bitmap and finding a value of 1 for a bit of the bitmap, wherein the bit corresponds to data in an overlap table associated with data of the first read command. The bitmap is a cache occupation bitmap for sequential read commands. The bitmap is a cache occupation bitmap for random read commands. The performing a full cache scan for the first read command occurs after a predetermined delay period of time. The controller is configured to determine whether the first read command is a sequential read command or a random read command. The controller is configured to maintain multiple cache occupation bitmaps.

In another embodiment, a data storage device comprises: means to store data; and a controller coupled to the means to store data, wherein the controller is configured to: maintain a first cache occupation bitmap; maintain a second cache occupation bitmap; receive a read command; detect a collision for the read command in one or more of the first cache occupation bitmap and the second cache occupation bitmap; perform a full cache scan; and deliver data associated with the read command to a host device. The controller is configured to perform a full cache scan when the collision is detected in both the first cache occupation bitmap and the second cache occupation bitmap. The maintaining the first cache occupation bitmap and the maintaining the second cache occupation bitmap occurs in parallel, and wherein the detecting occurs by checking either the first cache occupation bitmap or the second cache occupation bitmap based upon a detected workload.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a read command;
detect whether the read command is a sequential read command or a random read command;
maintain a single cache occupation bitmap that is either a sequential read workload based cache occupation bitmap or a random read workload based cache occupation bitmap, wherein the controller is configured to switch between maintaining the sequential read workload based cache occupation bitmap and the random read workload based cache occupation bitmap based on detecting either a random read workload or a sequential read workload;
search the single cache occupation bitmap;
determine whether a full cache scan is necessary, wherein determining whether a full cache scan is necessary comprises determining whether one or more bits of the single cache occupation bitmap has a value of 0 or 1, the one or more bits corresponding to the read command;
either:
perform the full cache scan when it is determined to be necessary; or
omit the full cache scan when it is determined to be unnecessary, wherein the full cache scan is omitted when the one or more bits of the single cache occupation bitmap has a value of 0; and
respond to the received read command by delivering data associated with the read command from the memory device to a host device after performing the full cache scan or omitting the full cache scan.

2. The data storage device of claim 1, wherein the controller is configured to maintain an additional cache occupation bitmap that is the other of the sequential read workload based cache occupation bitmap or the random read workload based cache occupation bitmap relative to the single cache occupation bitmap.

3. The data storage device of claim 1, wherein the single cache occupation bitmap comprises a plurality of bitmap bits, wherein each bit of the bitmap bits corresponds to a predetermined amount of a storage address range.

4. The data storage device of claim 3, wherein the predetermined amount is equal for each bitmap bit.

5. The data storage device of claim 3, wherein the predetermined amount comprises a plurality of address ranges that are logically sequential.

6. The data storage device of claim 5, wherein the plurality of logically sequential address ranges are randomly distributed within the storage address range.

7. The data storage device of claim 1, wherein upon determining that one or more bits of the single cache occupation bitmap has a value of 1, a full cache scan is performed to search for overlaps.

8. The data storage device of claim 7, wherein data for the read command is read from the memory device after performing the full cache scan.

9. The data storage device of claim 1, wherein the controller is configured to quiesce and flush the single cache occupation bitmap when switching between cache occupation bitmaps.

10. A data storage device, comprising:
- a memory device; and
- a controller coupled to the memory device, wherein the controller is configured to:
  - maintain a single cache occupation bitmap that is either a sequential read workload based cache occupation bitmap or a random read workload based cache occupation bitmap;
  - search the single cache occupation bitmap;
  - determine whether a full cache scan is necessary for one or more read commands, including a first, second, and third read command, wherein the determining whether a full cache scan is necessary comprises determining whether one or more bits of the single cache occupation bitmap has a value of 0 or 1, the one or more bits corresponding to the first, second, and third read commands, wherein the full cache scan is omitted when the one or more bits of the single cache occupation bitmap has a value of 0, and wherein the full cache scan is performed when the one or more bits of the single cache occupation bitmap has a value of 1;
  - determine that a full cache scan is necessary for the first read command of the one or more read commands;
  - determine that a full cache scan is not necessary for the second read command of the one or more read commands;
  - upon determining that the full cache scan is not necessary for the second read command, respond to the second read command by delivering data associated with the second read command from the memory device to a host device without performing the full cache scan;
  - determine that a full cache scan is necessary for the third read command of the one or more read commands, wherein the first read command, the second read command, and the third read command are received in order;
  - perform a full cache scan for the first read command and the third read command, wherein the full cache scan for the first read command occurs after determining that the full cache scan is not necessary for the second read command; and
  - respond to the first and third read commands by delivering data associated with the first and third read commands from the memory device to the host device after performing the full cache scan.

11. The data storage device of claim 10, wherein determining that a full cache scan is necessary for the first read command comprises checking the single cache occupation bitmap and finding a value of 1 for a bit of the bitmap, wherein the bit corresponds to data in an overlap table associated with data of the first read command.

12. The data storage device of claim 11, wherein the single cache occupation bitmap is for sequential read commands.

13. The data storage device of claim 11, wherein the single cache occupation bitmap is for random read commands.

14. The data storage device of claim 10, wherein the performing a full cache scan for the first read command occurs after a predetermined delay period of time.

15. The data storage device of claim 10, wherein the controller is configured to determine whether the first read command is a sequential read command or a random read command.

16. The data storage device of claim 10, wherein the controller is configured to maintain an additional cache occupation bitmap.

17. A data storage device, comprising:
- means to store data; and
- a controller coupled to the means to store data, wherein the controller is configured to:
  - maintain a first cache occupation bitmap, the first cache occupation bitmap being a sequential read workload based cache occupation bitmap;
  - maintain a second cache occupation bitmap for sequential read workloads, the second cache occupation bitmap being a random read workload based cache occupation bitmap;
  - receive a read command;
  - determine whether a collision is detected for the read command in one or more of the first cache occupation bitmap and the second cache occupation bitmap;
  - determine whether to perform a full cache scan, wherein the controller is configured to perform a full cache scan when the collision is detected in both the first cache occupation bitmap and the second cache occupation bitmap, wherein a full cache scan is omitted when no collision is detected;
  - either:
    - perform the full cache scan when a collision is detected; or
    - omit the full cache scan when no collision is detected;
  - deliver data associated with the read command to a host device after performing the full cache scan or omitting the full cache scan; and
  - switch between maintaining the first cache occupation bitmap and the second cache occupation bitmap based on detecting either a random read workload or a sequential read workload.

18. The data storage device of claim 17, wherein the maintaining the first cache occupation bitmap and the maintaining the second cache occupation bitmap occurs in parallel.

* * * * *